United States Patent
Grolman et al.

(10) Patent No.: US 12,533,756 B2
(45) Date of Patent: Jan. 27, 2026

(54) POLYMERIC COMPONENT AND METHOD OF MAKING THE SAME

(71) Applicant: Raytheon Technologies Corporation, Farmington, CT (US)

(72) Inventors: Danielle L. Grolman, Holden, MA (US); Wenping Zhao, Glastonbury, CT (US); John Joseph Gangloff, Middletown, CT (US); Justin B. Alms, Coventry, CT (US); Lei Xing, South Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 658 days.

(21) Appl. No.: 17/831,995

(22) Filed: Jun. 3, 2022

(65) Prior Publication Data
US 2023/0390874 A1 Dec. 7, 2023

(51) Int. Cl.
*B23K 35/36* (2006.01)
*B23K 103/00* (2006.01)
*D01F 9/12* (2006.01)

(52) U.S. Cl.
CPC ...... *B23K 35/3601* (2013.01); *B23K 35/3612* (2013.01); *D01F 9/12* (2013.01); *B23K 2103/38* (2018.08)

(58) Field of Classification Search
None
See application file for complete search history.

(56) References Cited

U.S. PATENT DOCUMENTS

| | | |
|---|---|---|
| 5,389,184 A | 2/1995 | Jacaruso et al. |
| 5,643,390 A | 7/1997 | Don et al. |
| 8,211,268 B1 | 7/2012 | Raghavendran et al. |
| 8,790,486 B2 | 7/2014 | Hou et al. |
| 11,192,351 B2 | 12/2021 | Macadams et al. |
| 2011/0062287 A1 | 3/2011 | Metzech et al. |
| 2016/0271906 A1 | 9/2016 | Iwano |
| 2017/0008221 A1 | 1/2017 | Huber et al. |
| 2017/0028698 A1 | 2/2017 | Weiland et al. |
| 2020/0086614 A1 | 3/2020 | Kruckenberg |
| 2021/0308956 A1 | 10/2021 | Beier et al. |
| 2021/0316527 A1 * | 10/2021 | Adamson ............... B32B 5/08 |

FOREIGN PATENT DOCUMENTS

| | | |
|---|---|---|
| EP | 0633836 | 2/1997 |
| WO | 2020232463 | 11/2020 |

OTHER PUBLICATIONS

European Search Report for European Patent Application No. 23177205.4 dated Nov. 10, 2023.

* cited by examiner

*Primary Examiner* — Arti Singh-Pandey
(74) *Attorney, Agent, or Firm* — Carlson, Gaskey & Olds, P.C.

(57) ABSTRACT

A thermoset component for joining with a thermoplastic component according to an exemplary embodiment of this disclosure, among other possible things includes a thermoset material, a weldable surface on the thermoset material, and a thermal barrier. The weldable surface includes a thermoplastic material. A hybrid polymeric component and a method of making a hybrid polymeric component are also disclosed.

20 Claims, 3 Drawing Sheets

POLYMERIC COMPONENT AND METHOD OF MAKING THE SAME

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

This disclosure relates to polymeric composite articles. Components, such as gas turbine engine components, may have certain performance requirements yet may benefit from being lightweight.

SUMMARY

A thermoset component for joining with a thermoplastic component according to an exemplary embodiment of this disclosure, among other possible things includes a thermoset material, a weldable surface on the thermoset material, and a thermal barrier. The weldable surface includes a thermoplastic material.

In a further example of the foregoing, the thermoplastic material of the weldable surface is an interlayer disposed on the thermal barrier. The thermal barrier is arranged between the interlayer and the thermoset material.

In a further example of any of the foregoing, the interlayer is a first interlayer. The thermoset component also includes a second interlayer between the thermal barrier and the thermoset material.

In a further example of any of the foregoing, the thermoplastic material of the weldable surface is thermoplastic fibers within the thermal barrier.

In a further example of any of the foregoing, the thermoplastic material of the weldable surface is infiltrated in the thermal barrier.

In a further example of any of the foregoing, the thermal barrier comprises ceramic or polymeric fibers.

In a further example of any of the foregoing, the thermal barrier comprises carbon fibers.

In a further example of any of the foregoing, the fibers are woven.

In a further example of any of the foregoing, the fibers are nonwoven.

A hybrid polymeric component according to an exemplary embodiment of this disclosure, among other possible things includes a thermoset portion, a thermoplastic portion joined to the thermoset portion at a welded joint, and a thermal barrier between the thermoset portion and the thermoplastic portion.

In a further example of the foregoing, the thermal barrier comprises ceramic or polymeric fibers.

In a further example of any of the foregoing, the thermal barrier comprises carbon fibers.

In a further example of any of the foregoing, the thermal barrier is at the joint.

In a further example of any of the foregoing, the fibers are woven.

In a further example of any of the foregoing, the fibers are nonwoven.

A method of making a hybrid polymeric component according to an exemplary embodiment of this disclosure, among other possible things includes forming a thermoset portion including a thermoset material and a weldable surface on the thermoset material, the weldable surface including a thermoplastic material, and a thermal barrier. The method also includes joining a thermoplastic portion to the thermoset portion by welding the thermoplastic portion to the weldable surface.

In a further example of the foregoing, the thermal barrier comprises ceramic or polymeric fibers.

In a further example of any of the foregoing, the thermal barrier comprises carbon fibers.

In a further example of any of the foregoing, the thermoplastic material of the weldable surface is thermoplastic fibers within the thermal barrier.

In a further example of any of the foregoing, the thermoplastic material of the weldable surface is infiltrated in the thermal barrier.

DETAILED DESCRIPTION

Figure 1:
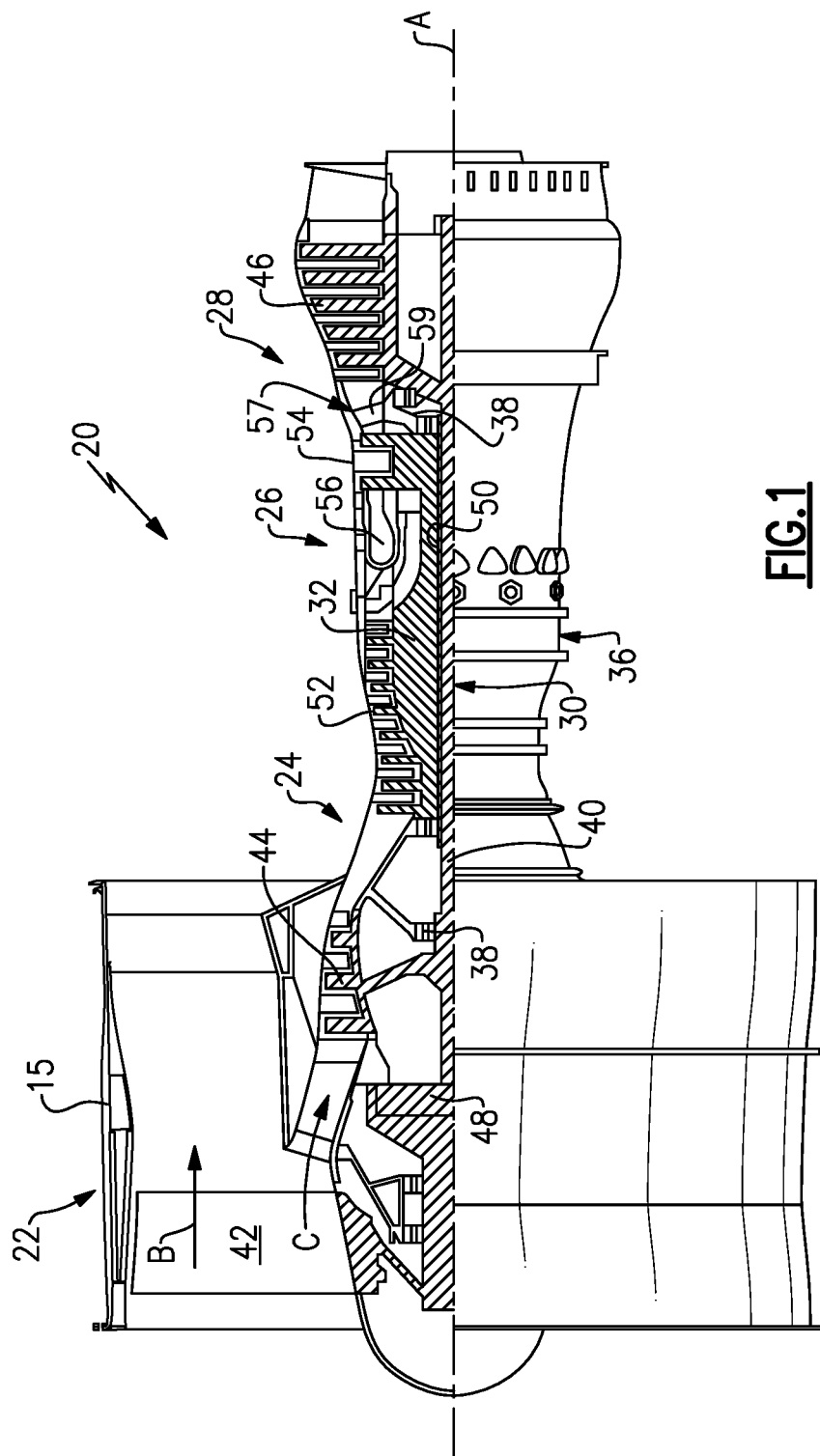
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Certain components of the engine 20 may be formed of polymer composites, such as polymer matrix composites (PMCs). One particular example is a nose cone or nose cone cap. In some examples, it may be advantageous to use a hybrid system that includes a combination of thermoset composites and thermoplastic composites to form lightweight high-performance articles such as various components of the gas turbine engine 20. However, conventionally, joining thermoset materials to thermoplastic materials poses certain challenges. Conventional bonding of thermoset to thermoplastic parts can prove to be challenging due to the difficulty of bonding adhesive materials to thermoplastic polymers stemming from inherently low surface free energy of thermoplastics, in addition to requirements for surface preparation and/or longer curing times typically required for adhesive bonding. Fusion bonding is a fast and effective bonding method for thermoplastic components, but is not suitable for conventional thermoset components unless there exists a thermoplastic interlayer, coupling film, or weldable surface on the thermoset component which enables fusion bonding to the thermoplastic component, as in the examples herein.

Additionally, the use of mechanical fasteners such as bolts, screws, clips and the like to join thermoset and thermoplastic composites adds weight to components including these hybrid systems. Mechanical fasteners are therefore not desired for certain applications where lightweight components are preferred. Mechanical fastening methods may also pose challenges and lead to problems arising from drilling with generation of high-stress concentrated areas and/or fiber breakage, galvanic corrosion, mismatch of coefficient of thermal expansion between the composites and the fasteners, and labor intensiveness.

Figure 2A:
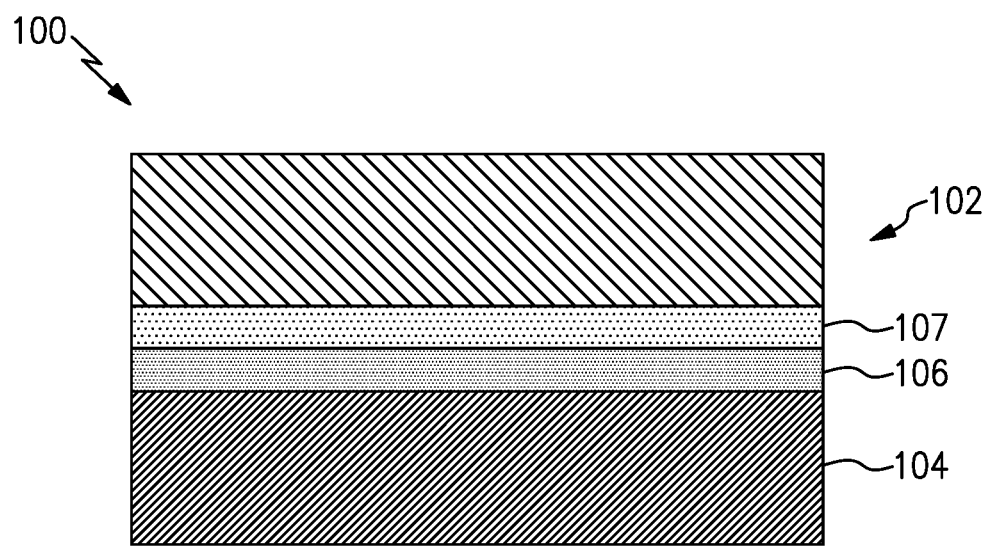
FIGS. 2*a-b* schematically shows an article with a joint and a thermoset portion for the article.

FIG. 2a shows an example hybrid composite article 100 according to the present disclosure. The hybrid composite article 100 includes a thermoset composite portion 102 joined to a thermoplastic composite portion 104. Any thermoset/thermoplastic materials could be used, but in some examples, the materials include polymeric or ceramic reinforcement, such as fibers, in a polymeric matrix. The thermoset/thermoplastic portions 102/104 are joined at a joint 106. The joint 106 is formed from welded or fused material and avoids the need for mechanical fasteners and/or adhesives. The article 100 also includes at least one thermal barrier 107.

The thermoplastic portion 104 can include polyetheretherketone (PEEK), polyetherimide (PEI), polyphenylene sulfide (PPS), polysulfone (PSU), polyethersulfone (PES), polyetherketoneketone (PEKK), polyaryletherketone (PAEK), or combinations thereof. The thermoset portion 102 can be an epoxy-based material, for instance.

Figure 2B:
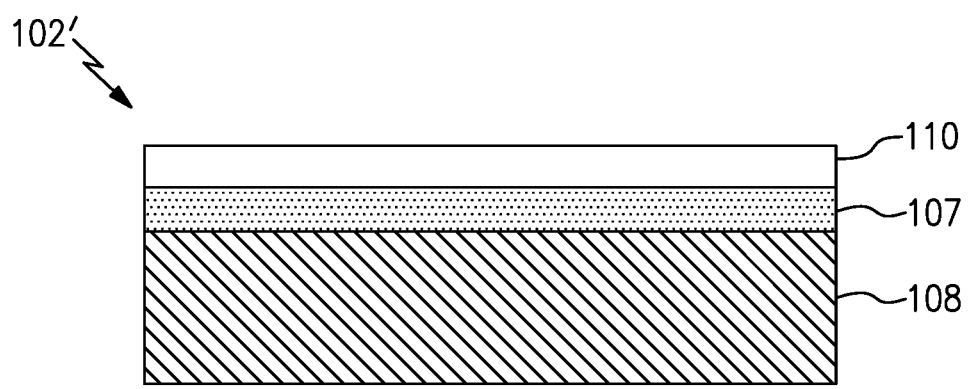

FIG. 2b shows the thermoset portion 102' prior to joining with the thermoplastic portion 104. Prior to being joined with the thermoplastic portion 104, the thermoset portion 102' is provided with a weldable surface as follows. A prepreg 108 of thermoset material such as epoxy is formed according to any known method. An interlayer 110 of thermoplastic material is disposed on the prepreg 108. The interlayer 110 can be in the form of a film or thin layer, or coating, or in the form of a surface treatment.

The thermoset portion 102' also includes a thermal barrier 107 arranged between the interlayer 110 and the prepreg 108. The thermal barrier 107 includes material with good thermal insulation properties, e.g. better thermal insulation properties than the thermoset portion 102'. For example, the thermal barrier 107 could include ceramic fibers such as carbon fiber or silicon carbide fiber, glass fibers, aramid fibers, oxide fibers, or other known fibers alone or in combination with thermoplastic fibers. In particular examples, the thermal barrier 107 is a fabric of woven fibers or a mat of nonwoven fibers. The thermal barrier 107 protects the thermoset portion 102' from heat during joining with the thermoplastic portion 104, which is discussed in more detail below. The thermal barrier 107 thus minimizes degradation of the thermoset portion 102' during the joining process.

The interlayer 110, thermal barrier 107, and the prepreg 108 are co-cured, e.g., the thermoset portion 102' is subject to curing conditions as appropriate for the particular makeup of the prepreg 108, which would be known in the art. During the co-curing, material from the interlayer 110, thermal barrier 107, and the prepreg 108 diffuse into one another to consolidate the interlayer 110, thermal barrier 107, and the prepreg 108 together. In particular, the thermal barrier 107 may be relatively more porous than the prepreg 108, encouraging infiltration of prepreg 108 material into the pores of the thermal barrier 107. In other examples, an adhesive may also be provided between the thermal barrier 107 and the prepreg 108.

The interlayer 110 is selected to be chemically compatible with the material of the prepreg 108 and the thermal barrier 107 as well as the thermoplastic portion 104, and to be curable under similar conditions as the material of the prepreg 108. Chemical compatibility, generally, is achieved when there are no or minimal undesirable chemical reactions between the material of the interlayer 110 and the prepreg 108/thermal barrier 107 and can allow for interdiffusion between materials to promote adhesion. Some examples of materials for the interlayer 110 are polyetheretherketone (PEEK), polyetherimide (PEI), polyphenylene sulfide (PPS), polysulfone (PSU), polyethersulfone (PES), polyetherketoneketone (PEKK), and polyaryletherketone (PAEK). The interlayer 110 can be the same or different material as the thermoplastic portion 104.

Figure 3:
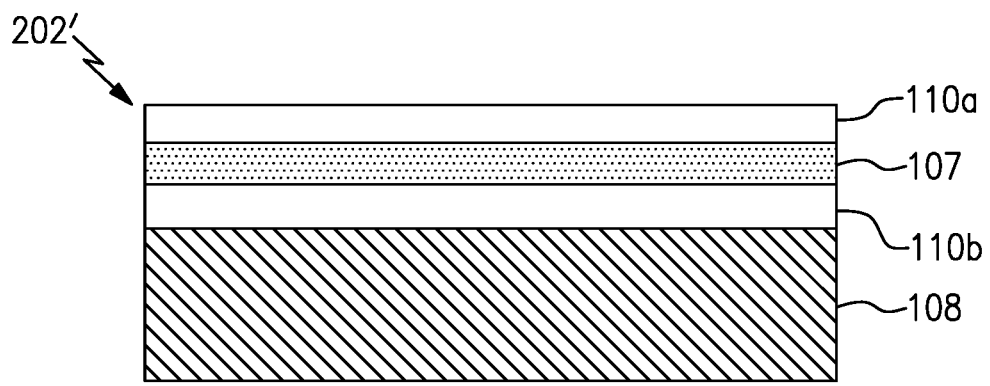
FIG. 3 schematically shows another example thermoset portion for the article.

In the example of FIGS. 2a-b, there is one interlayer 110. In another example shown in FIG. 3, the thermoset portion 202' prior to joining with the thermoplastic portion 104 includes two interlayers 110a/110b, with one interlayer 110a/110b disposed on either side of the thermal barrier 107. This example thus includes an additional interlayer 110b between the prepreg 108 and the thermal barrier 107. This additional interlayer 110b can improve bonding of the thermal barrier 107 to the prepreg 108 by promoting infiltration/diffusion of material between the thermal barrier 107 and the prepreg 108 during co-curing as discussed above.

The interlayers 110a/110b may be the same or different. At least the outer interlayer 110a is a weldable thermoplastic material, but the additional interlayer 110b may or may not be a weldable thermoplastic material. In a particular example, the interlayer 110b between the prepreg 108 and the thermal barrier 107 promotes infiltration/diffusion of material between the thermal barrier 107 and the prepreg 108 during co-curing as discussed above, while the interlayer 110a promotes welding/fusion with the thermoplastic portion 104. Either interlayer 110a/110b could also be a surface treatment, in another example. The interlayer 110a/110b may also act as an adhesion promoting layer or additional thermal barrier layer, may promote bonding of the interlayer 110a/110b to the prepreg 108 and/or the thermal barrier 107 during co-cure, and/or may provide temperature bridging for joining the thermoplastic component 104 to the thermoset component 102 where the thermoplastic component 104 requires a significantly higher processing temperature compared to the thermoset component 102/interlayer 110/110a. Temperature bridging may improve the joint 106 quality if there exists a large difference in melt temperature between the dissimilar materials of the thermoplastic component 104 and thermoset component 102/interlayer 110/110a during joining in subsequent method steps discussed below. A polymer material with significantly lower melting temperature compared to the other polymer material component will melt early and could lead to a poor bond.

The additional interlayer 110b may also provide mechanical support to the joint 106, in some examples.

In some examples, the interlayer 110/110a/110b is coated or otherwise applied onto the thermal barrier 107, and then the thermal barrier 107 with the interlayer 110/110a/110b is applied to the prepreg.

The article 100 is formed by arranging the thermoset portion 102 with the thermoplastic portion 104 such that the interlayer 110, or in examples with multiple interlayers 110a/110b, the outermost interlayer 110a, faces the thermoplastic portion 104. The article 100 can then be subjected to any known welding/fusion process such as resistance welding to cause the weldable surface/film 110 to be joined to the thermoplastic portion 104, thus forming the joint 106 to join the thermoset portion 102 to the thermoplastic portion 104. The thermal barrier 107 protects the thermoset portion 102 from heat during the welding/fusion as discussed above. In addition, the thermal barrier 107 may also provide mechanical support to the joint 106.

Figure 4:
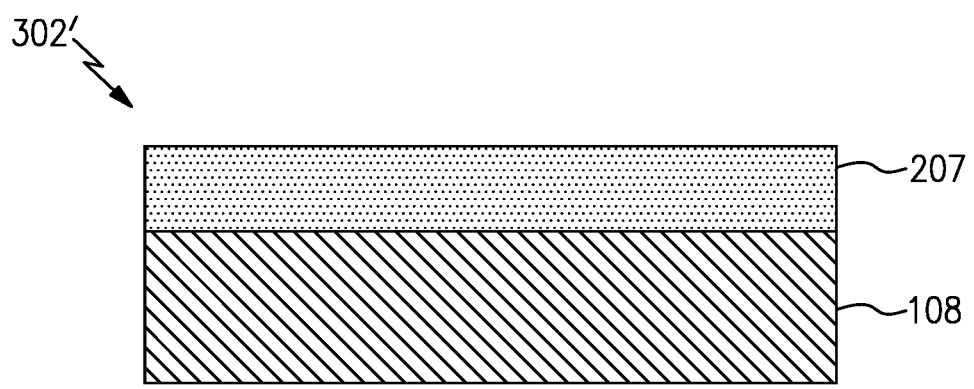
FIG. 4 schematically shows another example thermoset portion for the article.

In some examples, optional additional joining improvement may be made prior to the welding/fusion process. For instance, the thermoset portion 102/thermoplastic portion 104 may be treated with a surface treatment to improve adhesion. Such surface treatments are well known in the art. As another example, either of the thermoset portion 102, the thermoplastic portion 104, or both may be provided with features that allow for mechanical interlocking of the portions 102/104. FIG. 4 shows another example thermoset portion 302' prior to joining with the thermoplastic portion. In this example, the thermal barrier 207 includes an integrated interlayer. That is, the thermal barrier 207 includes thermoplastic material within it so that the thermal barrier 207 forms a weldable surface on the thermoset portion 302'. This further eliminates the need for additional thermoplastic film interlayer or coupling layer, e.g., the interlayer 110/110a/110b. The thermoplastic material can be in the form of thermoplastic fibers, or the thermoplastic material can be infiltrated into a fiber array of the thermal barrier 207, for instance. The thermal barrier 207 is co-cured with the prepreg 108 as in the examples discussed above. In this example, interlayers 110/110b/110c can be omitted or included. In the example of FIG. 4, the thermal barrier 207 forms the joint 106 when the thermoset portion 302' is joined with the thermoplastic portion 104.

In addition to the other advantage and contributions of the interlayer 110/110a/110b and/or thermal barrier 207 discussed above, the interlayer 110/110a/110b and/or thermal barrier 207 may also provide other protections to the thermoset portion 102 such as environmental and chemical protection, mechanical protection like impact resistance and toughness, and electrical insulation.

As used herein, the terms "about" or "approximately" have the typical meaning in the art, however in a particular example "about" and "approximately" can mean deviations of up to 10% of the values described herein.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A composite article comprising:
   a thermoset composite portion;
   a weldable surface on the thermoset composite portion, the weldable surface including a first interlayer, the first interlayer comprising a thermoplastic material;
   a thermal barrier, wherein the first interlayer is disposed on the thermal barrier, the thermal barrier is arranged between the first interlayer and the thermoset composite portion; and
   a second interlayer between the thermal barrier and the thermoset composite portion.

2. The composite article of claim 1, wherein the thermoplastic material of the weldable surface is thermoplastic fibers within the thermal barrier.

3. The composite article of claim 1, wherein the thermoplastic material of the weldable surface is infiltrated in the thermal barrier.

4. The composite article of claim 1, wherein the thermal barrier comprises ceramic or polymeric fibers.

5. The composite article of claim 4, wherein the fibers are woven.

6. The composite article of claim 4, wherein the fibers are nonwoven.

7. The composite article of claim 1, wherein the thermal barrier comprises carbon fibers.

8. The composite article of claim 1, further comprising:
   a thermoplastic portion joined to the thermoset composite portion at a welded joint including the first interlayer.

9. The composite article of claim 8, wherein the thermal barrier comprises ceramic or polymeric fibers.

10. The composite article of claim 9, wherein the fibers are woven.

11. The composite article of claim 9, wherein the fibers are nonwoven.

12. The composite article of claim 8, wherein the thermal barrier comprises carbon fibers.

13. The composite article of claim 8, wherein the thermal barrier is at the joint.

14. The article of claim 8, wherein the thermal barrier is porous and the thermoset composite portion is infiltrated into pores of the thermal barrier.

15. The article of claim 14, wherein the thermoplastic material of the weldable surface is infiltrated into the pores of the thermal barrier.

16. A method of making a composite article, comprising:
    forming a thermoset composite portion including a thermoset material and a weldable surface on the thermoset material, the weldable surface including a thermoplastic material, a thermal barrier, and a first interlayer comprising a thermoplastic material, and a second interlayer, the first interlayer is disposed on the thermal barrier, the thermal barrier arranged between the first interlayer and the thermoset composite portion, and the second interlayer between the thermal barrier and the thermoset composite portion; and
    joining a thermoplastic portion to the thermoset portion by welding the thermoplastic portion to the weldable surface.

17. The method of claim 16, wherein the thermal barrier comprises ceramic or polymeric fibers.

18. The method of claim 16, wherein the thermal barrier comprises carbon fibers.

19. The method of claim 16, wherein the thermoplastic material of the weldable surface is thermoplastic fibers within the thermal barrier.

20. The method of claim 16, wherein the thermoplastic material of the weldable surface is infiltrated in the thermal barrier.

* * * * *